United States Patent
Jiang et al.

(10) Patent No.: US 12,530,733 B2
(45) Date of Patent: Jan. 20, 2026

(54) IMAGE DATA STORAGE METHOD, IMAGE DATA PROCESSING METHOD AND SYSTEM, AND RELATED APPARATUS

(71) Applicant: INSPUR ELECTRONIC INFORMATION INDUSTRY CO., LTD., Shandong (CN)

(72) Inventors: Dongdong Jiang, Shandong (CN); Yaqian Zhao, Shandong (CN); Gang Dong, Shandong (CN); Rengang Li, Shandong (CN); Haiwei Liu, Shandong (CN); Hongbin Yang, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 471 days.

(21) Appl. No.: 17/926,966

(22) PCT Filed: Jan. 26, 2021

(86) PCT No.: PCT/CN2021/073790
§ 371 (c)(1),
(2) Date: Nov. 21, 2022

(87) PCT Pub. No.: WO2021/232843
PCT Pub. Date: Nov. 25, 2021

(65) Prior Publication Data
US 2023/0196500 A1    Jun. 22, 2023

(30) Foreign Application Priority Data
May 22, 2020    (CN) .......................... 202010442519.0

(51) Int. Cl.
*G06T 1/60* (2006.01)
*G06V 10/82* (2022.01)

(52) U.S. Cl.
CPC ................ *G06T 1/60* (2013.01); *G06V 10/82* (2022.01)

(58) Field of Classification Search
CPC .. G06T 1/60; G06T 7/13; G06V 10/82; G06N 3/063; G06N 3/0464; G06N 3/045; G06F 5/06; H04N 5/907
(Continued)

(56) References Cited

U.S. PATENT DOCUMENTS

| | | | |
|---|---|---|---|
| 2016/0342888 A1 | 11/2016 | Yang et al. | |
| 2018/0204118 A1* | 7/2018 | Ono | ........................ G06N 3/063 |
| 2020/0133854 A1* | 4/2020 | Yang | ........................ G06F 17/16 |

FOREIGN PATENT DOCUMENTS

| | | |
|---|---|---|
| CN | 109086867 A | 12/2018 |
| CN | 109800867 A | 5/2019 |

(Continued)

OTHER PUBLICATIONS

PCT/CN2021/073790 international search report and written opinion.

(Continued)

*Primary Examiner* — Gautam Sain
*Assistant Examiner* — Wei Ma
(74) *Attorney, Agent, or Firm* — IPro, PLLC (57) ABSTRACT

Provided are an image data storage method, an image data processing method and system, and a related apparatus. The image data processing method includes the following steps: sequentially storing image data in a dynamic random memory according to a preset storage format, so that adjacent pieces of image data in the dynamic random memory have continuous storage addresses; reading a preset number of pieces of multi-channel parallel image data from the dynamic random memory, and storing the multi-channel parallel image data in a first-in first-out memory of an (Continued)

FPGA; and executing a convolution operation on target image data in the first-in first-out memory to obtain image feature data. By means of the method, the image data processing rate can be increased.

11 Claims, 8 Drawing Sheets

(58) Field of Classification Search
USPC .......................................................... 711/1
See application file for complete search history.

(56) References Cited

FOREIGN PATENT DOCUMENTS

| | | | | |
|---|---|---|---|---|
| CN | 110674927 A | | 1/2020 | |
| CN | 110826707 A | * | 2/2020 | ............ G06N 3/063 |
| CN | 111583095 A | | 8/2020 | |

OTHER PUBLICATIONS

EP21808636.1 extended European search report dated Feb. 26, 2024.

* cited by examiner

IMAGE DATA STORAGE METHOD, IMAGE DATA PROCESSING METHOD AND SYSTEM, AND RELATED APPARATUS

CROSS-REFERENCE TO RELATED APPLICATION

The present disclosure claims the priority of the Chinese patent application filed on May 22, 2020 before the CNIPA, China National Intellectual Property Administration with the application number of 202010442519.0 and the title of "IMAGE DATA STORAGE METHOD, IMAGE DATA PROCESSING METHOD AND SYSTEM, AND RELATED APPARATUS", which is incorporated herein in its entirety by reference.

FIELD

The present application relates to the technical field of deep learning and, more particularly, to an image data storage method, an image data processing method, an image data processing system, an electronic device, and a storage medium.

BACKGROUND

Convolutional Neural Networks (CNN) are feed-forward neural networks involving convolution computation and having deep structures and have been widely used in computer vision, image processing, natural language processing, and other fields.

Generally, convolutional neural networks use a 3*3 convolution kernel to extract image features. In the prior art, an FPGA CNN convolution data extraction is primarily implemented by buffering the image data to the FPGA's off-chip DDR (Double Data Rate) memory, and reading only a small piece of 3*3 data at a time for convolution, multiple reading small ranges of DDR is used. However, the image feature extraction method stated above needs to perform multiple address jumping, and reading and writing small pieces of data of non-continuous addresses, in which case, a rate of reading and writing DDR is low, and the read-write capability of DDR cannot be fully unleashed, which is a bottleneck of image processing rate.

Therefore, at present, how to improve the rate of processing image data is a technical problem required to be solved by those skilled in the art.

SUMMARY

It is an object of the present application to provide an image data storage method, an image data processing method and system, an electronic device, and a storage medium capable of improving the rate of processing image data.

In order to solve the above technical problem, the present application provides an image data storage method, including:
  receiving an image storage instruction;
  determining image data and a dynamic random memory according to the image storage instruction; and
  sequentially storing the image data in the dynamic random memory according to a preset storage format, to make that adjacent pieces of image data in the dynamic random memory have continuous storage addresses.

In an embodiment of the present application, sequentially storing the image data in the dynamic random memory according to the preset storage format includes:
  determining a storage start position of the dynamic random memory, and from the storage start position, sequentially storing the image data to the dynamic random memory along a channel direction, wherein the storage start position includes a channel height coordinate and a channel width coordinate;
  determining whether the channel width coordinate of the storage start position is greater than a width maximum value;
  under the condition that the channel width coordinate of the storage start position is greater than the width maximum value, when all the channel directions corresponding to the storage start position are fully occupied for storage, adding 1 to the channel height coordinate of the storage start position, setting the channel width coordinate of the storage start position to be 0 to obtain a new storage start position, and from the new storage start position, sequentially storing remaining pieces of image data to the dynamic random memory along the channel direction; and
  under the condition that the channel width coordinate of the storage start position is not greater than the width maximum value, when all the channel directions corresponding to the storage start position are fully occupied for storage, adding 1 to the channel width coordinate of the storage start position to obtain a new storage start position, and from the new storage start position, sequentially storing remaining pieces of image data to the dynamic random memory along the channel direction.

In an embodiment of the present application, after sequentially storing the image data in the dynamic random memory according to the preset storage format, further including:
  under the condition that the data read instruction is received, determining target data according to a data read instruction, wherein the target data is multi-channel parallel image data; and
  transferring the target data to a first-input first-output memory of a field programmable gate array.

The present application further provides an image data processing method, including:
  sequentially storing image data in a dynamic random memory according to a preset storage format, to make that adjacent pieces of image data in the dynamic random memory have continuous storage addresses;
  reading a preset number of multi-channel parallel image data from the dynamic random memory, and storing the multi-channel parallel image data to a first-input first-output memory of a field programmable gate array; and
  subjecting the target image data in the first-input first-output memory to a convolution operation to obtain image feature data.

In an embodiment of the present application, sequentially storing image data in a dynamic random memory according to the preset storage format includes:
  determining a storage start position of the dynamic random memory, and from the storage start position, sequentially storing the image data to the dynamic random memory along a channel direction, wherein the storage start position includes a channel height coordinate and a channel width coordinate;
  determining whether the channel width coordinate of the storage start position is greater than a width maximum value;

under the condition that the channel width coordinate of
the storage start position is greater than the width
maximum value, when all the channel directions corresponding to the storage start position are fully occupied for storage, adding 1 to the channel height coordinate of the storage start position, setting the channel
width coordinate of the storage start position to be 0 to
obtain a new storage start position, and from the new
storage start position, sequentially storing remaining
pieces of image data to the dynamic random memory
along the channel direction; and under the condition that the channel width coordinate of
the storage start position is not greater than the width
maximum value, when all the channel directions corresponding to the storage start position are fully occupied for storage, adding 1 to the channel width coordinate of the storage start position to obtain a new
storage start position, and from the new storage start
position, sequentially storing remaining pieces of
image data to the dynamic random memory along the
channel direction.

In an embodiment of the present application, reading a preset number of multi-channel parallel image data from the dynamic random memory includes:

determining a memory read address in a present round, and reading the preset number of multi-channel parallel image data according to the memory read address in the present round; and reading a preset number of multi-channel parallel image data from the dynamic random memory further includes:

calculating a memory read address in a next round according to the memory read address in the present round; and after the first-input first-output memory of the field programmable gate array is ready, according to the memory read address in the next round, reading a preset number of multi-channel parallel new image data, and storing the multi-channel parallel new image data to the first-input first-output memory of the field programmable gate array.

In an embodiment of the present application, reading the preset number of multi-channel parallel image data according to the memory read address in the present round includes:

taking the memory read address in the present round as a first start address, and calculating a second start address and a third start address according to the first start address and a data read length;

reading a preset number of multi-channel parallel first image data according to the first start address;

reading a preset number of multi-channel parallel second image data according to the second start address; and reading a preset number of multi-channel parallel third image data according to the third start address.

In an embodiment of the present application, the multi-channel parallel image data is 3*11 multi-channel image data; and subjecting the target image data in the first-input first-output memory to a convolution operation to obtain image feature data includes:

converting the 3*11 multi-channel image data in the first-input first-output memory into 9*9 multi-channel image data; and subjecting the 9*9 multi-channel image data to the convolution operation using a 3*3 convolution kernel to obtain the image feature data.

In an embodiment of the present application, when converting the 3*11 multi-channel image data in the first-input first-output memory into the 9*9 multi-channel image data, further including:

controlling a state machine to perform an operation of reading parity data at a same time to remove invalid intervals generated when the 3*11 multi-channel image data is converted into the 9*9 multi-channel image data.

In an embodiment of the present application, when reading the preset number of multi-channel parallel image data from the dynamic random memory, further including:

determining whether a data volume of the multi-channel parallel image data that is read reaches a preset value; and under the condition that a data volume of the multi-channel parallel image data that is read does not reach a preset value, padding with zeros at after the multi-channel parallel image data that is read to make the data volume equals the preset value.

The present application further provides an image data processing system, including:

a storage module configured for sequentially storing image data in a dynamic random memory according to a preset storage format, to make adjacent pieces of image data in the dynamic random memory have continuous storage addresses;

a read module configured for reading a preset number of multi-channel parallel image data from the dynamic random memory, and storing the multi-channel parallel image data to a first-input first-output memory of a field programmable gate array; and a convolution module configured for subjecting the target image data in the first-input first-output memory to a convolution operation to obtain image feature data.

The present application further provides an electronic device, including a memory and a processor, a computer program being stored in the memory, the processor implementing steps of the method according to any of claims 1 to 10 when invoking the computer program in the memory.

The present application further provides a storage medium, in which a computer program being stored, when the computer program being loaded and executed by a processor, implementing steps of the method according to any of claims 1 to 10.

The present application provides an image data processing method, including: sequentially storing image data in a dynamic random memory according to a preset storage format, so that adjacent pieces of image data in the dynamic random memory have continuous storage addresses; reading a preset number of pieces of multi-channel parallel image data from the dynamic random memory, and storing the multi-channel parallel image data in a first-input first-output memory of an FPGA; and subjecting target image data in the first-input first-output memory to a convolution operation to obtain image feature data.

According to the present application, firstly, image data is sequentially stored into a dynamic random memory in a preset storage format so that adjacent pieces of image data in the dynamic random memory have continuous storage addresses. When the data in the dynamic random memory are read, the desirable data may be read sequentially according to instructions, and since the continuous storage of image data may avoid the storage address jumps, the rate of reading and writing the dynamic random memory is improved. After the multi-channel parallel image data is read from the dynamic random memory, the read image data is stored in the first-input first-output memory of the FPGA. The first-input first-output memory has a feature of small read-write delay, so subjecting the image data in the first-input first-output memory to a convolution operation reduces the read-write delay and improves the data storage efficiency. Based on the features of the dynamic random memory for its large capacity and high continuous reading and writing rate and the first-input first-output memory for its small read-write delay, the present application allows, firstly, sequentially storing all image data to the dynamic random memory, reading the multi-channel parallel image data from the dynamic random memory and storing the same to the first-input first-output memory, thereby reducing the read-write delay of image data processing and improving the rate of processing the image data. In addition, an image data storage method, an image data processing system, an electronic device, and a storage medium are provided herein, which share the above-mentioned advantages and will not be detailed here.

BRIEF DESCRIPTION OF THE DRAWINGS

To illustrate the embodiments of the present application more clearly, a brief description will be given below of the drawings necessary for the embodiments. Apparently, the drawings in the following description are only some embodiments of the present application, and those of ordinary skill in the art may obtain other drawings based on these drawings without involving any inventive effort.

DETAILED DESCRIPTION

In order that the objects, aspects, and advantages of the embodiments of the present disclosure will become more apparent, a more complete description of the embodiments of the present disclosure will be rendered by reference to the appended drawings, which are provided for purposes of illustration and are not intended to be exhaustive of or limiting the present disclosure. All the other embodiments obtained by a person of ordinary skill in the art based on the embodiments in the present application without involving any inventive effort shall fall within the scope of the present application.

Figure 1:
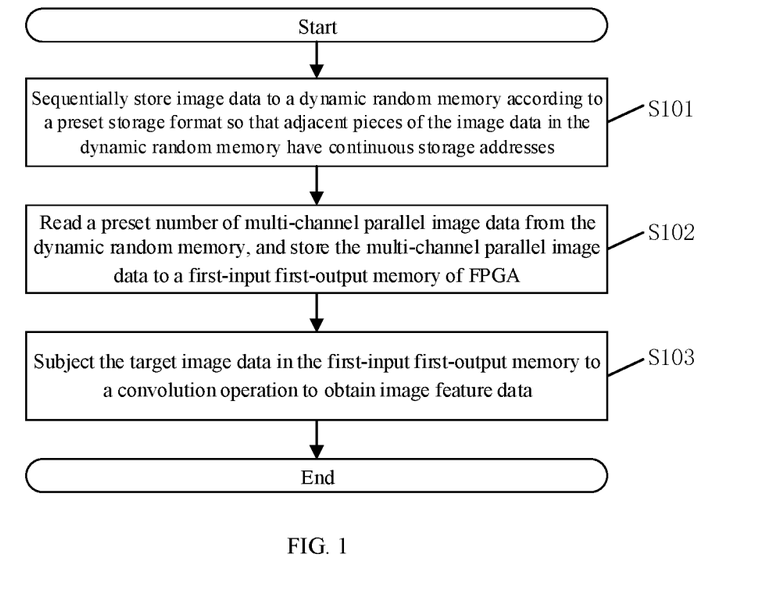
FIG. 1 is a flow chart of an image data processing method according to an embodiment of the present application.

Reference is now made to FIG. 1, which is a flow chart of an image data processing method according to an embodiment of the present application.

The method includes the following steps specifically.

In S101, image data is stored sequentially to a dynamic random memory according to a preset storage format to make that adjacent pieces of the image data in the dynamic random memory have continuous storage addresses.

Figure 2:
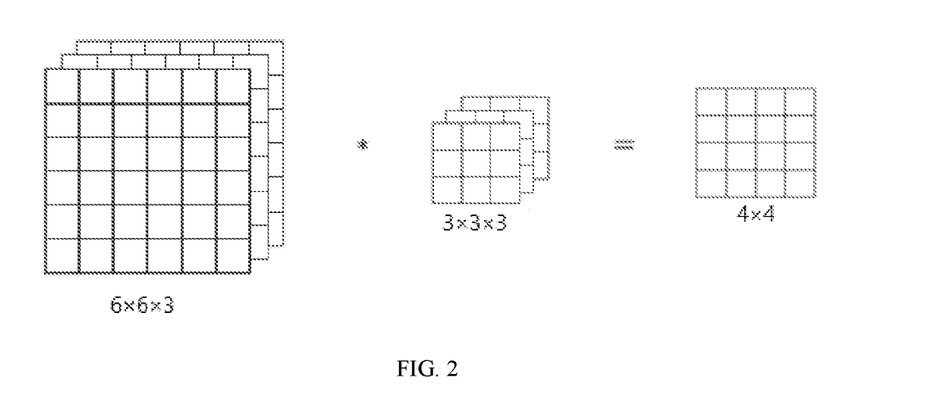
FIG. 2 is a schematic diagram of a three-dimensional convolution calculation process performed in convolutional neural networks according to an embodiment of the present application.

Here, the present embodiment may be applied to an image processing apparatus including convolutional neural networks, in which a related image processing operation may be performed through an FPGA (Field Programmable Gate Array). With reference to FIG. 2, a schematic diagram of a three-dimensional convolution calculation process performed in convolutional neural networks according to an embodiment of the present application, the three-dimensional convolution calculation process performed in the convolutional neural networks is as follows. A 6×6×3 colorful image, where 3 refers to three color channels, may be understood as a stack of three 6×6 images. To detect the edge or other features of the image, the colorful image is convolved with a three-dimensional filter, and the dimension of the filter is 3×3×3, that is, the filter also has three layers corresponding to three channels of red, green, and blue, respectively. The first 6 of 6×6×3 colorful image represents a height of the image, the second 6 represents a width of the image, and 3 represents the number of channels. Correspondingly, the filter has a height, width, and number of channels, and the number of channels of the image is the same as that of the filter. A 4×4×1 image may be obtained through convolution. Apparently, to extract various features, there may be a plurality of output channels, for example, the original image may be convolved with two convolution kernels to obtain feature data of two output channels.

According to the present application, firstly, image data to be processed (e.g., a 6×6×3 colorful image for executing convolution processing in FIG. 2) is stored sequentially to a dynamic random memory according to a preset storage format. The dynamic random memory is an off-chip DDR of the FPGA, and by storing the image data according to the preset format, it is possible for the image data stored in adjacent storage addresses in the dynamic random memory to be continuous. Since the overall size is large and a plurality of storage addresses are required to store the image data, there may be an operation of converting an original image into continuous image data before this step, and the image data corresponding to adjacent storage addresses where the image data is continuous in the present embodiment is also continuous in the original image corresponding to the image data. Stored in the preset format, adjacent image data may have consecutive storage addresses.

In S102, a preset number of multi-channel parallel image data is read from the dynamic random memory, and the multi-channel parallel image data is stored to a first-input first-output memory of the FPGA.

Here, after the image data is stored in the dynamic random memory, in the present embodiment, a preset number of multi-channel parallel image data may be read from the dynamic random memory in preset cycles, and since the image data stored in the dynamic random memory is continuous in S101, the multi-channel parallel image data may be obtained through one time of data read in S102. Generally, a plurality of lines of image data are subjected to convolution, and in the present embodiment, a preset number of data reading operations may be performed to obtain the preset number of multi-channel parallel image data. The preset number of multi-channel parallel image data, once obtained, may be stored in the first-input first-output memory of the FPGA. The FIFO (first-input first-output) memory of the FPGA is the one in the RAM (Random Access Memory) resources within the FPGA. In the process of reading the preset number of multi-channel parallel image data from the dynamic random memory, it is also possible to determine whether a data volume of the multi-channel parallel image data that is read reaches a preset value; and if not, padding with zeros at after the multi-channel parallel image data that is read to make the data volume equals the preset value.

Since it is necessary to read data from the dynamic random memory for several times, as a feasible embodiment, the above-mentioned process of reading the preset number of multi-channel parallel image data from the dynamic random memory may include determining a memory read address in a present round, and reading the preset number of multi-channel parallel image data according to the memory read address in the present round. Accordingly, the present embodiment may further include: calculating a memory read address in a next round according to the memory read address in the present round; after the first-input first-output memory of the FPGA is ready, according to the memory read address in the next round, reading a preset number of multi-channel parallel new image data, and storing the multi-channel parallel new image data to the first-input first-output memory of the FPGA.

In S103, the target image data in the first-input first-output memory is subjected to a convolution operation to obtain image feature data.

Herein, after reading the image data to the first-input first-output memory of the FPGA, the FPGA may read N*N data at any position in one cycle for convolution calculation at the back end to obtain the image feature data. In the present embodiment, storing multi-channel parallel image data in the first-input first-output memory of the FPGA in S102 is equivalent to inputting data to the FPGA, and subjecting the target image data to the convolution operation in S103 is equivalent to outputting data from the FPGA. In the present embodiment, the rate of data reading in S102 and the rate of the convolution operation in S103 are appropriately adjusted so that the volume of data in the FPGA is relatively stable.

According to the present embodiment, firstly, the image data is sequentially stored to a dynamic random memory in a preset storage format to make that adjacent pieces of image data in the dynamic random memory have continuous storage addresses. When the data in the dynamic random memory are read, the desirable data may be sequentially read according to instructions, and since the continuous storage of image data may avoid the storage address jumps, the rate of reading and writing the dynamic random memory is improved. After the multi-channel parallel image data is read from the dynamic random memory, the read image data is stored in the first-input first-output memory of the FPGA. The first-input first-output memory has a feature of small read-write delay, so subjecting the image data in the first-input first-output memory to a convolution operation reduces the read-write delay and improves the data storage efficiency. Based on the features of the dynamic random memory for its large capacity and high continuous reading and writing rate and the first-input first-output memory for its small read-write delay, the present embodiment allows, firstly, storing all image data sequentially to the dynamic random memory, reading the multi-channel parallel image data from the dynamic random memory and storing the same to the first-input first-output memory, thereby reducing the read-write delay of image data processing and improving the rate of processing the image data.

Figure 3:
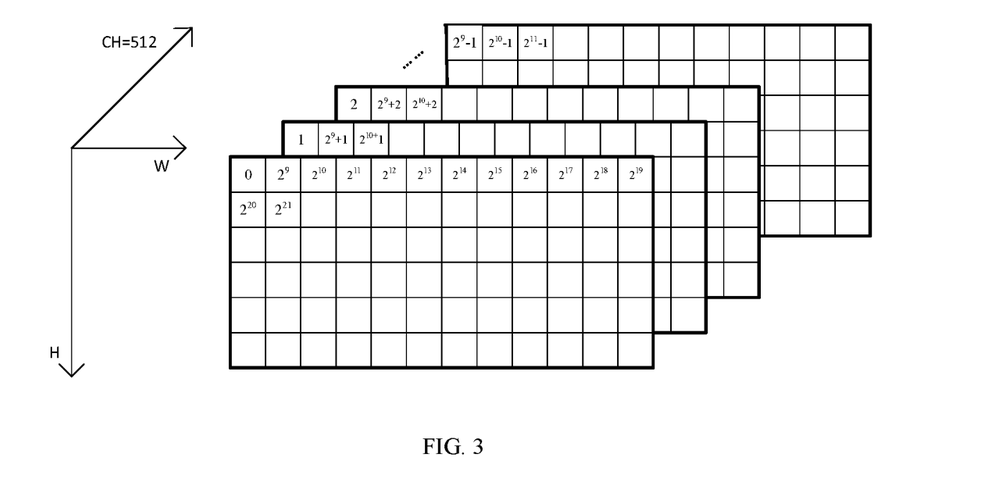
FIG. 3 is a schematic diagram illustrating how image data is stored into a dynamic random memory according to an embodiment of the present application.

With reference to FIG. 3, a schematic diagram illustrating how image data is stored to a dynamic random memory according to an embodiment of the present application, CH denotes the number of channels, W is the channel width, and H is the channel height; in the image herein, the number of channels is 512, the channel width is 12, and the channel height is 6. Sequentially storing image data in a dynamic random memory according to a preset storage format includes: determining a storage start position of the dynamic random memory, and from the storage start position, sequentially storing the image data to the dynamic random memory along a channel direction, wherein the storage start position includes a channel height coordinate and a channel width coordinate; determining whether the channel width coordinate of the storage start position is greater than a width maximum value. If so, when all the channel directions corresponding to the storage start position are fully occupied for storage, adding 1 to the channel height coordinate of the storage start position, setting the channel width coordinate of the storage start position to be 0 to obtain a new storage start position, and from the new storage start position, sequentially storing remaining pieces of image data to the dynamic random memory along the channel direction. If not, when all the channel directions corresponding to the storage start position are fully occupied for storage, adding 1 to the channel width coordinate of the storage start position to obtain a new storage start position, and from the new storage start position, sequentially storing remaining pieces of image data to the dynamic random memory along the channel direction.

As shown in FIG. 3, in the present embodiment, data to be input to the channels is written to the DDR according to a preset storage format, and the numbers in the grid in the figure represent the addresses of the image data in the DDR. The channel (CH) direction is constant as 512, and the data is firstly stored in the DDR along the channel number direction, wherein the corresponding addresses is 0 to 511; if the channels that have an actual input are less than 512, the corresponding addresses are given a value of 0. After data storage along the channel (CH) direction is completed, the data is stored in the width (W) direction. After data storage along the W direction is completed, the data is stored along the H direction. The lengths of W and H may be customized (e.g., 7 to 512).

Figure 4:
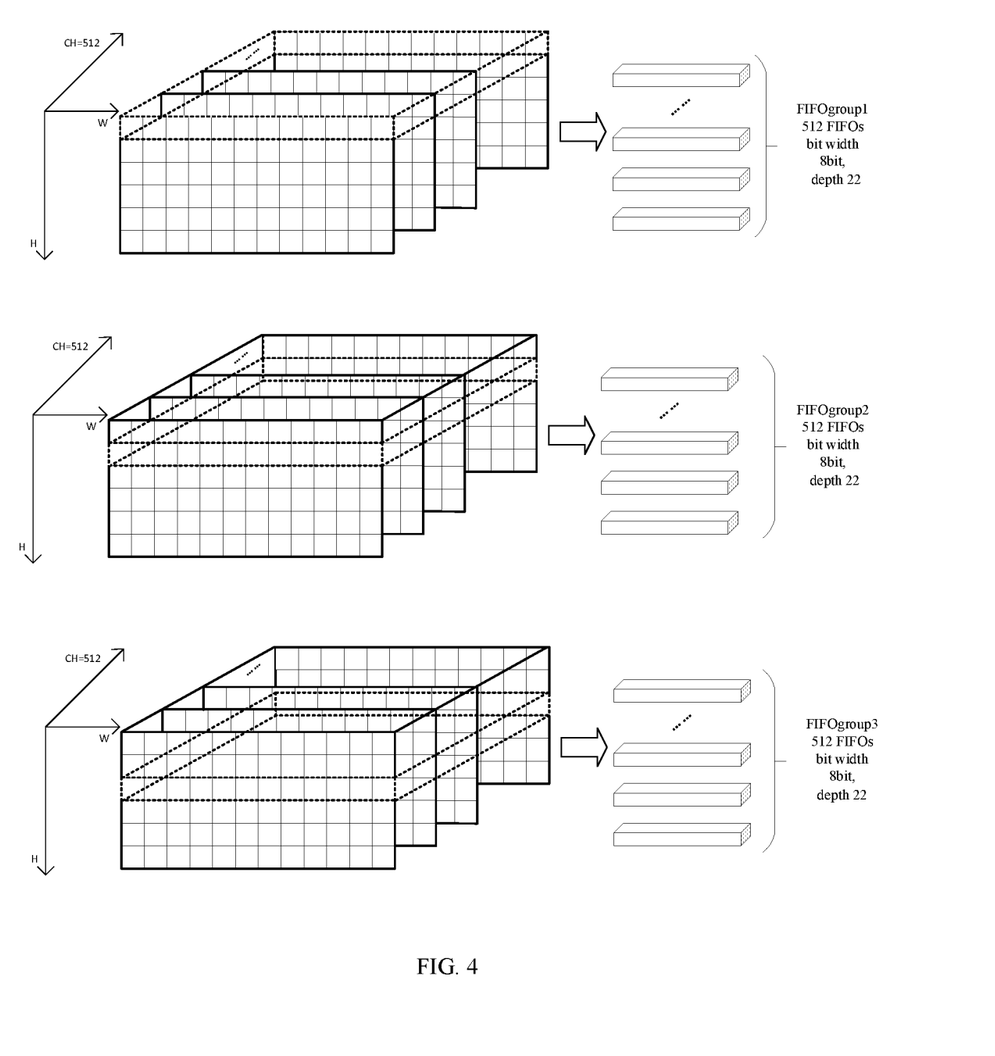
FIG. 4 is a schematic diagram illustrating how to read multi-channel parallel image data according to an embodiment of the present application.

As a further introduction to the above embodiment, the process of reading the preset number of multi-channel parallel image data from the dynamic random memory may include: determining a memory read address in a present round, and reading the preset number of multi-channel parallel image data according to the memory read address in the present round; and reading a preset number of multi-channel parallel image data from the dynamic random memory further includes: calculating a memory read address in a next round according to the memory read address in the present round; and after the first-input first-output memory of the field programmable gate array is ready, according to the memory read address in the next round, reading a preset number of multi-channel parallel new image data, and storing the multi-channel parallel new image data to the first-input first-output memory of the field programmable gate array. Specifically, if the multi-channel parallel image data is 3*11 multi-channel image data, the present embodiment may include taking the memory read address in the present round as a first start address, and calculating a second start address and a third start address according to the first start address and a data read length; reading a preset number of multi-channel parallel first image data according to the first start address; reading a preset number of multi-channel parallel second image data according to the second start address; and reading a preset number of multi-channel parallel third image data according to the third start address. On the basis of the data storage mode in the corresponding embodiment of FIG. 3, in the DDR, 11 pieces of data of all channels may be read at a time as per instructions, and the burst length is sufficient to keep the reading efficiency of the DDR above 50%. Reference is now made to FIG. 4, a schematic diagram illustrating how to read multi-channel parallel image data according to an embodiment of the present application. The process of reading multi-channel parallel image data from the DDR may be as follows: a first group of 11 pieces of data of each channel is read, and an instruction is sent to DDR, mandating that, for example, the start address be h(0)*w(0)*512 and the read length be 512*11; after this, a second group of 11 pieces of data is read, and an instruction is sent to the DDR, mandating that the start address be h(1)*w(0)*512 and the read length be 512*11; after this, a third group of 11 pieces of data is read, and an instruction is sent to DDR, mandating that the start address be h(2)*w(0)*512, and the read length be 512*11; the read data is stored into the FIFOs of three groups of FPGA, each group having 512 FIFOs. After the reading is completed, if stride is 1, which may be set, the next group of start addresses is the last group of start addresses plus 512*9, and the next group of start addresses will be updated upon the calculation.

Figure 5:
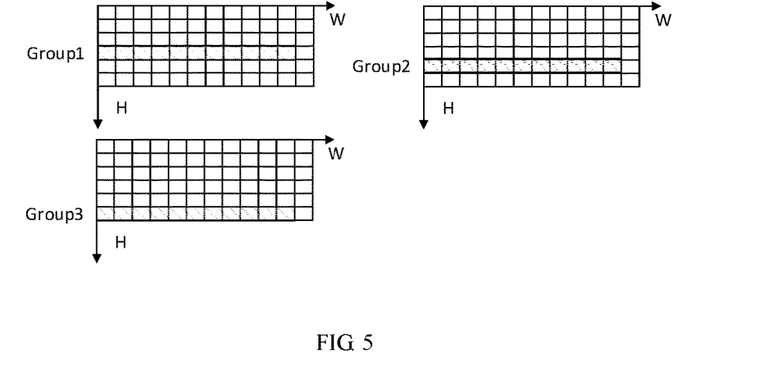
FIG. 5 is a schematic diagram illustrating how to calculate a start address for the reading of the dynamic random memory and a management mode thereof according to an embodiment of the present application.

With reference to FIG. 5, a schematic diagram illustrating how to calculate a start address for the reading of the dynamic random memory and a management mode thereof according to an embodiment of the present application, the coordinates of the three groups of data in the W and H directions are set as the values in Table 1:

TABLE 1

Coordinates of Start Addresses

| Group | Coordinate |
|---|---|
| group1 | $(x, y_1)$ |
| group2 | $(x, y_2)$ |
| group3 | $(x, y_3)$ |

The coordinates in the W direction in Table 1 are consistent. Taking Stride=1 as an example, the new address calculation management mode is shown in Table 2, and a requirement of a 500 MHz high-speed clock may be met by using 3 multipliers plus shifting and zero-padding.

TABLE 2

Calculation Relationship of Addresses

| Group | x = 0 | x! = 0 |
|---|---|---|
| group1 | add1 = $(y_1 \times w)$ << 9 | add1 = add1 + (9 << 9) |
| group2 | add2 = $(y_2 \times w)$ << 9 | add1 = add1 + (9 << 9) |
| group3 | add3 = $(y_3 \times w)$ << 9 | add1 = add1 + (9 << 9) |

Figure 6:
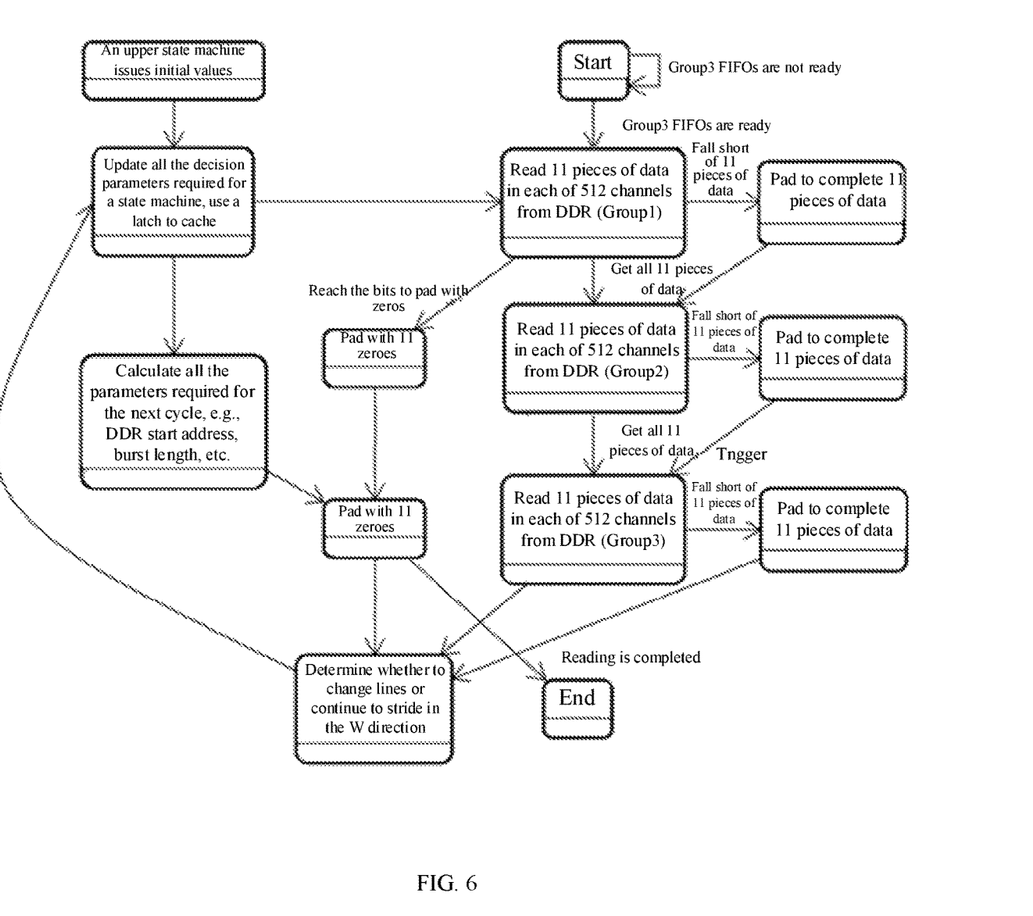
FIG. 6 is a flow chart of controlling a state machine when implementing DDR data reading according to an embodiment of the present application.

With reference to FIG. 6, a flow chart of controlling a state machine when implementing DDR data reading according to an embodiment of the present application, each time of writing data is in the order of group1, group2, and then group3, but at the read-out ports, the three groups of FIFOs are read in parallel, and to reduce fan-out of a Register Transfer Level (RTL), it would be enough by checking the group3 FIFOs are ready or not only once upon reading the group1. The present embodiment may further provide an address update multiplier. In the case of a 500 MHz clock, the safe calculation cycles of the address update multiplier are greater than or equal to 3. If the parameters to be updated are calculated only temporarily upon the line change is determined, either the timing requirement cannot be met or there are additional 3 calculation cycles, resulting in an increase of 3 clocks in the delay for the whole state machine. Therefore, it is necessary to design an early calculation unit separately for calculating all the parameters required for the next cycle, such as the DDR start address and burst length. All the values needed after the start are calculated before the start, and a lock register is backed up for use by the state machine at the start. Moreover, in the meantime of the execution of the whole state machine, all the values required for the next cycle state are independently performed, so that the timing requirement of the multiplier at 500 MHz may be satisfied. Further, the Look Up Table (LUT) layers as determined by the state machine are reduced to ≤4, without additional system delay.

Figure 7:
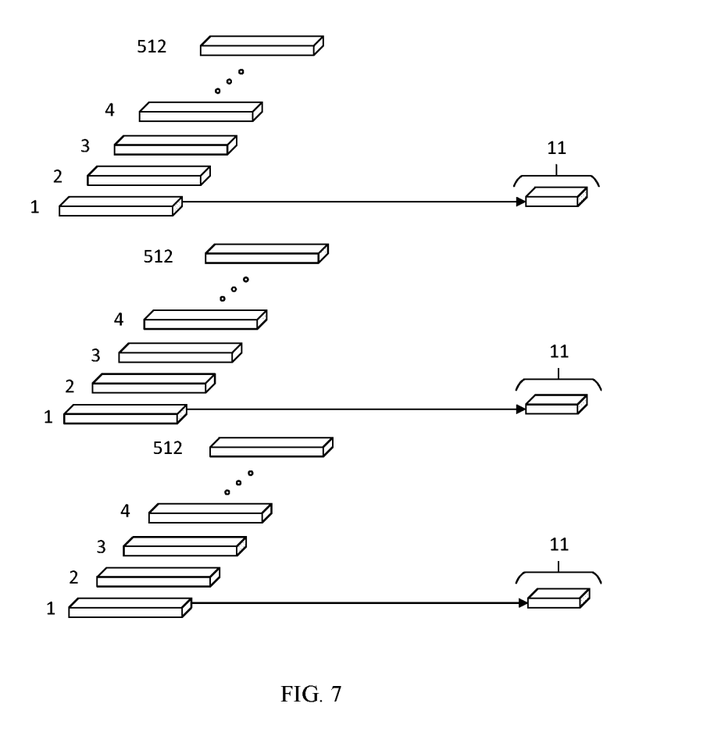
FIG. 7 is a schematic diagram of data reading according to an embodiment of the present application.

When the data in the three groups of FIFOs are ready, 3*11 data may be read according to channels, and since the number of input channels may be set, only a required number of input channels need to be read; for example, when the input channels are 3, 3*11 data of only the 3 channels need to be read, as shown in FIG. 7 below, a schematic diagram of data reading according to an embodiment of the present application.

As a feasible embodiment, when the multi-channel parallel image data is specifically 3*11 multi-channel image data, the process of calculating the image feature data may include: converting the 3*11 multi-channel image data in the first-input first-output memory into 9*9 multi-channel image data; and subjecting the 9*9 multi-channel image data to the convolution operation using a 3*3 convolution kernel to obtain the image feature data. Furthermore, when converting the 3*11 multi-channel image data in the first-input first-output memory into 9*9 multi-channel image data, the process further includes controlling a state machine to perform an operation of reading parity data at a same time to remove invalid intervals generated when the 3*11 multi-channel image data is converted into the 9*9 multi-channel image data.

Figure 8:
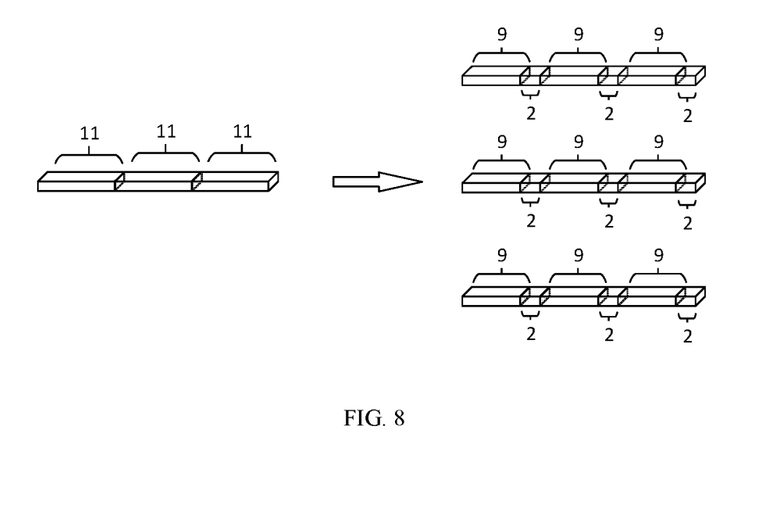
FIG. 8 is a schematic diagram of data conversion according to an embodiment of the present application.
Figure 9:
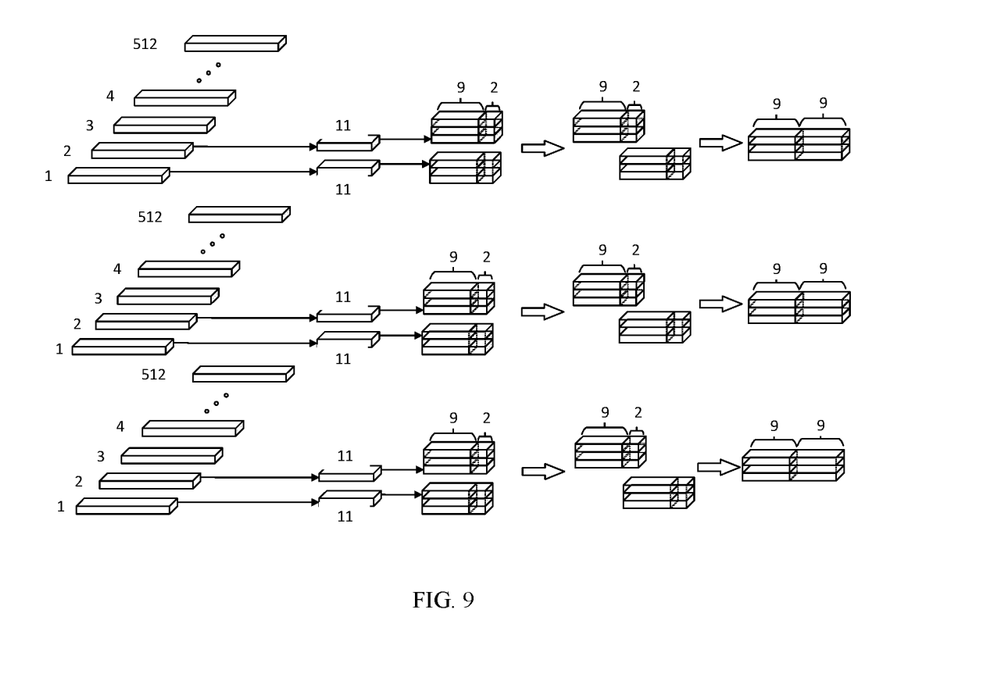
FIG. 9 is a schematic diagram illustrating how to eliminate intermediate intervals according to an embodiment of the present application.

Specifically, reference is made to FIG. 8, a schematic diagram of data conversion according to an embodiment of the present application. The back-end algorithm of the FPGA may change 11 pieces of data to 3 pieces of 9*9 data to facilitate a 3*3 convolution, and the 11 pieces of data read here, even if continuous, will generate a 2-cycle invalid interval when changed into 3 pieces of 9*9 data, the invalid interval being a cycle where the convolution operation is unnecessary. In the present embodiment, a continuous output of data may be achieved by eliminating the intermediate intervals through a state machine capable of reading of parity data at a same time. With reference to FIG. 9, a schematic diagram illustrating how to eliminate intermediate intervals according to an embodiment of the present application, in the present embodiment, 11 pieces of data of two consecutive channels may be read at the same time, and after 7 clock cycles, the 11-to-9 data conversion is performed; the data of the second channel is delayed for 9 cycles and then spliced with the data of the first channel, that is, the intermediate interval is eliminated.

Let the number of real input channels be Cin, the DDR clock F_ddr be 250 MHz, the convolution clock F_dsp at the back end be 500 MHz, and the number of FIFOs in each group/64 be N (N=512/64=8 in the above example), then the bandwidth balance equation for data at both ends is:

$$\frac{51*N}{F\_ddr} \le \frac{9*Cin}{F\_dsp} => Cin \ge 91;$$

if N=1 (the number of FIFOs is 64), then Cin≥12. As long as Cin, the number of real input channels, is large enough, data may be transferred and run with no loss of efficiency at a 500 MHz clock. If Cin≥12, it would be enough by modifying the storage format of DDR properly (e.g., CH=64) without changing the RTL design. Cin being even smaller is not a condition for multiple input channels and may be used in the present embodiment with some loss of efficiency. If FIFOs in each group are 512, for a pipeline-style operation, the FIFOs shall be deep enough for a ping-pong operation, and a depth of 11*2=22 may ensure that when reading feature data, the reading will not be suspended because there is no data at the back end of the FIFOs. At this time, the maximum RAM utilization rate is only 15% of VU7 (xilinx Ultrascale plus Virtex 7 FPGA, an FPGA board card), without any pressure on the back-end DSP (Digital Signal Processing) convolution array wiring.

The present application may also provide a method for storing multidimensional convolution feature data in a DDR. Multi-channel feature data may be read out simultaneously, which is suitable for the back-end extraction process, and the DDR reading efficiency is not less than 50%. In the present application, the minimum resources for the start address of the feature data may be calculated through the change of configuration parameters, three multipliers are used, and a safe operation at a 500 MHz clock may be ensured, without causing additional system delay. The control process of fast image reading according to the above embodiment includes as follows: calculating the parameters and controlling the state machine two-line operation and cooperation to avoid a determination that the time during which the calculation starts and holds is not satisfied when the state transfers, LUT cascades ≤4, the operating condition of the 500 MHz clock is satisfied, and the RAM resources required do not exceed 15% of the VU7. In the present embodiment, the present disclosure makes full use of the advantages of large capacity, low price, fast continuous read-write speed of DDR, and small read-write delay of FPGA-RAM, combines the advantages of both, and designs a method for continuously reading the feature data at a 500 MHz clock (LUT cascades ≤4). The width and height of the feature data may be set as appropriate (≤512), the resource utilization of RAM is less than 15%, and an implementation on FPGA using RTL is enabled. Here, LUT refers to Look Up Table.

In the present embodiment, a high-speed, multi-channel, low-resource utilization hardware architecture is designed by combine features of DDR for its fast continuous reading and writing and FPGA RAM for its low resource utilization. Under the control of different configuration parameters, the image data may be read continuously at a 500 MHz clock, and the resource utilization is no more than 15%. Such a hardware architecture may be applied to neural network calculation. In the present embodiment, a multi-dimensional convolution multi-channel high-speed low-capacity data reading method is provided, which may fully meet the extraction requirement of a common ResNet50 convolution model, and may arbitrarily expand to multiple modules in the case of sufficient hardware resources, so as to improve the parallelism of data processing and speed up the calculation.

Figure 10:
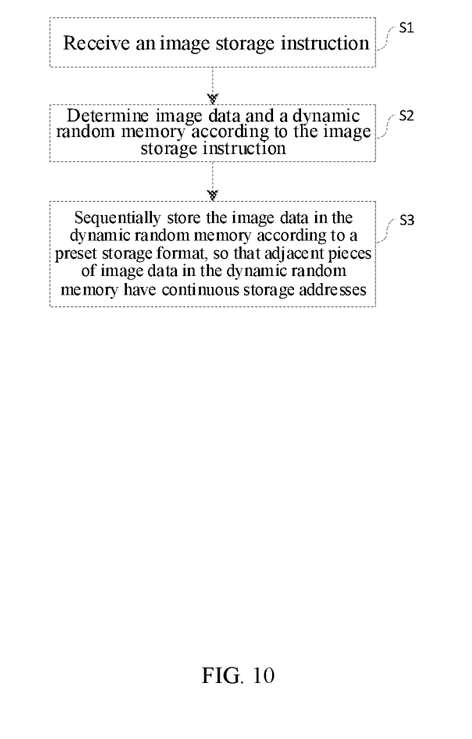
FIG. 10 is a flow chart of an image data storage method according to an embodiment of the present application.

Embodiments of the present application also provide an image data storage method, as shown in FIG. 10, specifically including the steps of:
step S1: receiving an image storage instruction;
step S2: determining image data and a dynamic random memory according to the image storage instruction; and
step S3: sequentially storing the image data in the dynamic random memory according to a preset storage format to make that adjacent pieces of image data in the dynamic random memory have continuous storage addresses.

Here, the image storage instruction in the present embodiment may be an instruction issued by a user or an instruction generated during image data processing. The image data is sequentially stored to the dynamic random memory according to the preset storage format, so that adjacent pieces of the image data in the dynamic random memory have consecutive storage addresses. When reading the data in the dynamic random memory, the required data may be read in response to sequential instructions, and since the continuous storage of the image data may avoid storage address jumps, the rate of reading and writing the dynamic random memory is improved. When processing the image data stored through the above-described method, the rate of processing the image data may be increased.

As a further introduction to the above-mentioned embodiment, the process of sequentially storing the image data to the dynamic random memory according to a preset storage format in step S3 may include: determining a storage start position of the dynamic random memory, and from the storage start position, sequentially storing the image data to the dynamic random memory along a channel direction, wherein the storage start position includes a channel height coordinate and a channel width coordinate; determining whether the channel width coordinate of the storage start position is greater than a width maximum value; if so, when all the channel directions corresponding to the storage start position are fully occupied for storage, adding 1 to the channel height coordinate of the storage start position, setting the channel width coordinate of the storage start position to be 0 to obtain a new storage start position, and from the new storage start position, sequentially storing remaining pieces of image data to the dynamic random memory along the channel direction; if not, when all the channel directions corresponding to the storage start position are fully occupied for storage, adding 1 to the channel width coordinate of the storage start position to obtain a new storage start position, and from the new storage start position, sequentially storing remaining pieces of image data to the dynamic random memory along the channel direction.

Further, the storage method includes: after sequentially storing the image data in the dynamic random memory according to the preset storage format, determining target data according to a data read instruction. If the data read instruction is received, wherein the target data is multi-channel parallel image data, and transferring the target data to a first-input first-output memory of an FPGA.

Figure 11:
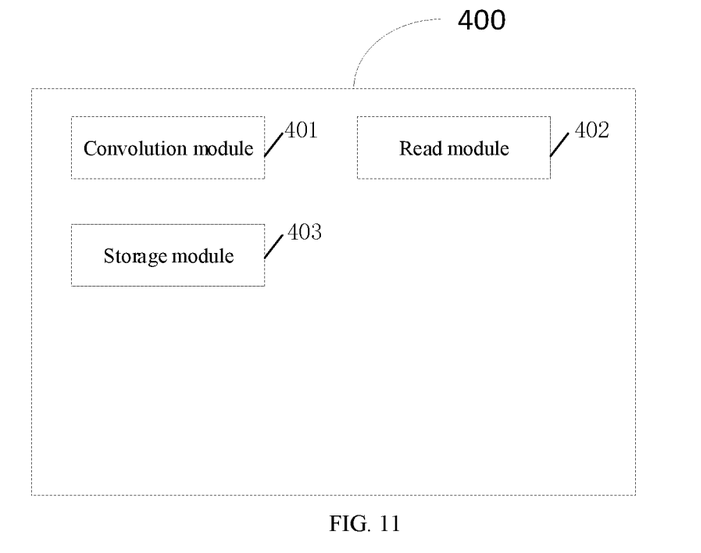
FIG. 11 is a schematic diagram showing a structure of an image data processing system according to an embodiment of the present application.

Embodiments of the present application also provide an image data processing system 400, as shown in FIG. 11, including:
- a storage module 401 configured for sequentially storing image data in a dynamic random memory according to a preset storage format, to make that adjacent pieces of image data in the dynamic random memory have continuous storage addresses;
- a read module 402 configured for reading a preset number of multi-channel parallel image data from the dynamic random memory, and storing the multi-channel parallel image data to a first-input first-output memory of a field programmable gate array; and
- a convolution module 403 configured for subjecting the target image data in the first-input first-output memory to a convolution operation to obtain image feature data.

According to the present embodiment, firstly, image data is sequentially stored to a dynamic random memory in a preset storage format so that adjacent pieces of image data in the dynamic random memory have continuous storage addresses. When the data in the dynamic random memory are read, the desirable data may be read sequentially according to instructions, and since the continuous storage of image data may avoid the storage address jumps, the rate of reading and writing the dynamic random memory is improved. After the multi-channel parallel image data is read from the dynamic random memory, the read image data is stored in the first-input first-output memory of the FPGA. The first-input first-output memory has a feature of small read-write delay, so subjecting the image data in the first-input first-output memory to a convolution operation reduces the read-write delay and improves the data storage efficiency. Based on the features of the dynamic random memory for its large capacity and high continuous reading and writing rate and the first-input first-output memory for its small read-write delay, the present embodiment allows, firstly, sequentially storing all image data to the dynamic random memory, reading the multi-channel parallel image data from the dynamic random memory and storing the same to the first-input first-output memory, thereby reducing the read-write delay of image data processing and improving the rate of processing the image data.

Further, the storage module is configured for determining a storage start position of the dynamic random memory, and from the storage start position, sequentially storing the image data to the dynamic random memory along a channel direction, wherein the storage start position includes a channel height coordinate and a channel width coordinate; the storage module is also configured for determining whether the channel width coordinate of the storage start position is greater than a width maximum value. If so, when all the channel directions corresponding to the storage start position are fully occupied for storage, adding 1 to the channel height coordinate of the storage start position, setting the channel width coordinate of the storage start position to be 0 to obtain a new storage start position, and from the new storage start position, sequentially storing remaining pieces of image data to the dynamic random memory along the channel direction. If not, when all the channel directions corresponding to the storage start position are fully occupied for storage, adding 1 to the channel width coordinate of the storage start position to obtain a new storage start position, and from the new storage start position, sequentially storing remaining pieces of image data to the dynamic random memory along the channel direction.

Further, the read module is configured for determining a memory read address in a present round, and reading the preset number of multi-channel parallel image data according to the memory read address in the present round; the read module is also configured for calculating a memory read address in a next round according to the memory read address in the present round; the read module is further configured for after the first-input first-output memory of the FPGA is ready, reading the preset number of multi-channel parallel new image data according to the memory read address in the next round, and storing the multi-channel parallel new image data to the first-input first-output memory of the FPGA.

Further, the read module is configured for: taking the memory read address in the present round as a first start address, and calculating a second start address and a third start address according to the first start address and a data read length; reading the preset number of multi-channel parallel first image data according to the first start address; reading the preset number of multi-channel parallel second image data according to the second start address; and reading the preset number of multi-channel parallel third image data according to the third start address.

Further, the multi-channel parallel image data is specifically 3*11 multi-channel image data.

The convolution module is configured for: converting the 3*11 multi-channel image data in the first-input first-output memory into 9*9 multi-channel image data, and subjecting the 9*9 multi-channel image data to the convolution operation using a 3*3 convolution kernel to obtain the image feature data.

Further, the system includes:
- an interval elimination module for, when converting the 3*11 multi-channel image data in the first-input first-output memory into 9*9 multi-channel image data, controlling a state machine to perform a simultaneous reading of parity data to remove invalid intervals generated when converting the 3*11 multi-channel image data in the first-input first-output memory into the 9*9 multi-channel image data.

Further, the system includes:
- a padding module for, when reading the preset number of multi-channel parallel image data from the dynamic random memory, determining whether a data volume of the multi-channel parallel image data that is read reaches a preset value; and if not, padding with zeros at after the multi-channel parallel image data that is read to make the data volume equals the preset value.

Since the embodiments of the system and the embodiments of the method correspond to each other, reference may be made to the description of the embodiments of the method to understand the embodiments of the system, which will not be detailed here.

Figure 12:
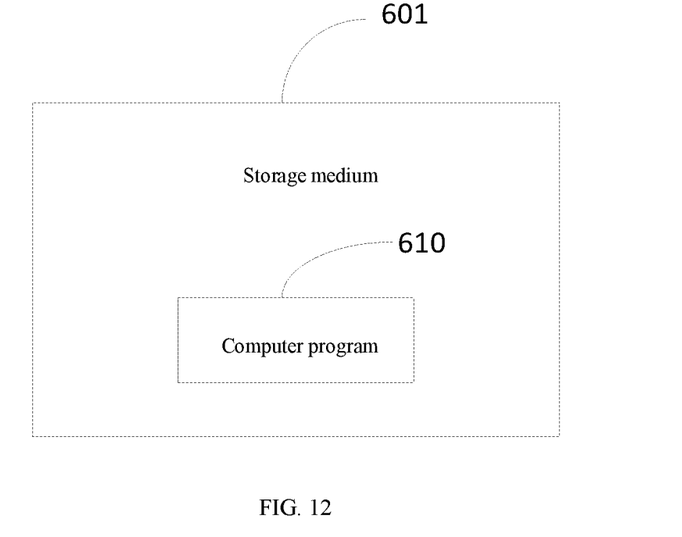
FIG. 12 is a schematic diagram showing a structure of a storage medium according to an embodiment of the present application.

As shown in FIG. 12, the present application also provides a storage medium 601 having stored thereon a computer program 610 that is executable to perform the steps provided in the embodiments described above. The storage medium may include a flash drive, portable hard drive, read-only memory (ROM), random access memory (RAM), magnetic or optical disk, and various media capable of storing program code.

Figure 13:
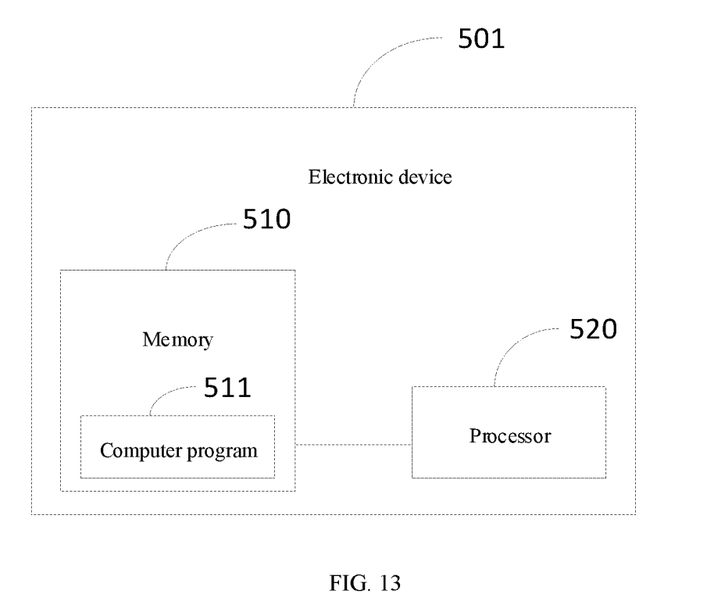
FIG. 13 is a schematic diagram showing a structure of an electronic device according to an embodiment of the present application.

As shown in FIG. 13, the present application also provides an electronic device 501, which may include: a memory 510 having stored therein a computer program 511, and a processor 520 which, when invoking the computer program 511 in the memory 510, may perform the steps provided in the above embodiments. Apparently, the electronic device may also include various components such as a network interface and a power supply.

Various embodiments are described in the specification progressively, with each embodiment focusing on differences from the other embodiments, and with reference to one another, the embodiments have their same or similar parts explained. The system disclosed in the embodiments corresponds to the method disclosed in the embodiments, and is thus described in a relatively simple manner, that is, reference may be made to the embodiments of the method to understand the relevant parts of the system. It should be noted that those skilled in the art may make modifications and variations to the present disclosure without departing from the spirit and scope of the present disclosure, and such modifications and variations shall also fall within the scope of the claims of the present application.

It should also be noted that the relational terms such as "first" and "second" in the present specification are used solely to distinguish one entity or operation from another entity or operation without necessarily requiring or implying any actual such relationship or order between such entities or operations. Furthermore, the terms like "include", "comprise", or any other variations thereof, are intended to indicate a non-exclusive inclusion, such that a process, method, article, or apparatus that includes a list of elements does not include only those elements but may include other elements not expressly listed or inherent to such process, method, article, or apparatus. An element defined by a phrase like "includes a . . . " does not, without further constraints, preclude the existence of additional identical elements in the process, method, article, or apparatus that includes the element.

The invention claimed is:

1. An image data storage method, comprising:
receiving an image storage instruction;
determining image data and a dynamic random memory according to the image storage instruction; and
sequentially storing the image data in the dynamic random memory according to a preset storage format, to make that adjacent pieces of image data in the dynamic random memory have continuous storage addresses;
wherein sequentially storing the image data in the dynamic random memory according to the preset storage format comprises:
determining a storage start position of the dynamic random memory, and from the storage start position, sequentially storing the image data to the dynamic random memory along a channel direction, wherein the storage start position comprises a channel height coordinate and a channel width coordinate;
determining whether the channel width coordinate of the storage start position is greater than a width maximum value;
under the condition that the channel width coordinate of the storage start position is greater than the width maximum value, detecting that all the channel directions corresponding to the storage start position are fully occupied for storage, and in response to detecting that all the channel directions corresponding to the storage start position are fully occupied for storage, adding 1 to the channel height coordinate of the storage start position, setting the channel width coordinate of the storage start position to be 0 to obtain a new storage start position, and from the new storage start position, sequentially storing remaining pieces of image data to the dynamic random memory along the channel direction; and
under the condition that the channel width coordinate of the storage start position is not greater than the width maximum value, detecting that all the channel directions corresponding to the storage start position are fully occupied for storage, and in response to detecting that all the channel directions corresponding to the storage start position are fully occupied for storage, adding 1 to the channel width coordinate of the storage start position to obtain a new storage start position, and from the new storage start position, sequentially storing remaining pieces of image data to the dynamic random memory along the channel direction;
after sequentially storing the image data in the dynamic random memory according to the preset storage format, further comprising:
under the condition that the data read instruction is received, determining target data according to a data read instruction, wherein the target data is multi-channel parallel image data; and transferring the target data to a first-input first-output memory of a field programmable gate array.

2. An image data processing method, comprising:
sequentially storing image data in a dynamic random memory according to a preset storage format, to make that adjacent pieces of image data in the dynamic random memory have continuous storage addresses;
reading a preset number of multi-channel parallel image data from the dynamic random memory, and storing the multi-channel parallel image data to a first-input first-output memory of a field programmable gate array; and
subjecting the target image data in the first-input first-output memory to a convolution operation to obtain image feature data;
wherein sequentially storing image data in the dynamic random memory according to the preset storage format comprises:
determining a storage start position of the dynamic random memory, and from the storage start position, sequentially storing the image data to the dynamic random memory along a channel direction, wherein the storage start position comprises a channel height coordinate and a channel width coordinate;
determining whether the channel width coordinate of the storage start position is greater than a width maximum value;
under the condition that the channel width coordinate of the storage start position is greater than the width maximum value, detecting that all the channel directions corresponding to the storage start position are fully occupied for storage, and in response to detecting that all the channel directions corresponding to the storage start position are fully occupied for storage, adding 1 to the channel height coordinate of the storage start position, setting the channel width coordinate of the storage start position to be 0 to obtain a new storage start position, and from the new storage start position, sequentially storing remaining pieces of image data to the dynamic random memory along the channel direction; and under the condition that the channel width coordinate of the storage start position is not greater than the width maximum value, detecting that all the channel directions corresponding to the storage start position are fully occupied for storage, and in response to detecting that all the channel directions corresponding to the storage start position are fully occupied for storage, adding 1 to the channel width coordinate of the storage start position to obtain a new storage start position, and from the new storage start position, sequentially storing remaining pieces of image data to the dynamic random memory along the channel direction;

wherein reading a preset number of multi-channel parallel image data from the dynamic random memory comprises:

determining a memory read address in a present round, and reading the preset number of multi-channel parallel image data according to the memory read address in the present round; and reading a preset number of multi-channel parallel image data from the dynamic random memory further comprises:

calculating a memory read address in a next round according to the memory read address in the present round; and after the first-input first-output memory of the field programmable gate array is ready, according to the memory read address in the next round, reading a preset number of multi-channel parallel new image data, and storing the multi-channel parallel new image data to the first-input first-output memory of the field programmable gate array.

3. The image data processing method according to claim 2, wherein reading the preset number of multi-channel parallel image data according to the memory read address in the present round comprises:

taking the memory read address in the present round as a first start address, and calculating a second start address and a third start address according to the first start address and a data read length;

reading a preset number of multi-channel parallel first image data according to the first start address;

reading a preset number of multi-channel parallel second image data according to the second start address; and reading a preset number of multi-channel parallel third image data according to the third start address.

4. The image data processing method according to claim 3, wherein the multi-channel parallel image data is 3*11 multi-channel image data; and subjecting the target image data in the first-input first-output memory to a convolution operation to obtain image feature data comprises:

converting the 3*11 multi-channel image data in the first-input first-output memory into 9*9 multi-channel image data; and subjecting the 9*9 multi-channel image data to the convolution operation using a 3*3 convolution kernel to obtain the image feature data.

5. The image data processing method according to claim 4, when converting the 3*11 multi-channel image data in the first-input first-output memory into the 9*9 multi-channel image data, further comprising:

controlling a state machine to perform an operation of reading parity data at a same time to remove invalid intervals generated when the 3*11 multi-channel image data is converted into the 9*9 multi-channel image data.

6. The image data processing method according to claim 2, when reading the preset number of multi-channel parallel image data from the dynamic random memory, further comprising:

determining whether a data volume of the multi-channel parallel image data that is read reaches a preset value; and under the condition that a data volume of the multi-channel parallel image data that is read does not reach a preset value, padding with zeros at after the multi-channel parallel image data that is read to make the data volume equals the preset value.

7. The image data processing method according to claim 2, wherein when the multi-channel parallel image data is 3*11 multi-channel image data, the method further comprises:

taking the memory read address in the present round as a first start address.

8. The image data processing method according to claim 7, wherein the method further comprises:

calculating a second start address and a third start address according to the first start address and a data read length.

9. The image data processing method according to claim 8, wherein the method further comprises:

reading a preset number of multi-channel parallel first image data according to the first start address;

reading a preset number of multi-channel parallel second image data according to the second start address; and reading a preset number of multi-channel parallel third image data according to the third start address.

10. A non-transitory computer-readable storage medium, storing a computer program that is executed executable by a processor, and upon execution by the processor, is configured to cause the processor to implementing operations as follows:

receiving an image storage instruction;

determining image data and a dynamic random memory according to the image storage instruction; and sequentially storing the image data in the dynamic random memory according to a preset storage format, to make that adjacent pieces of image data in the dynamic random memory have continuous storage addresses;

wherein sequentially storing the image data in the dynamic random memory according to the preset storage format comprises:

determining a storage start position of the dynamic random memory, and from the storage start position, sequentially storing the image data to the dynamic random memory along a channel direction, wherein the storage start position comprises a channel height coordinate and a channel width coordinate;

determining whether the channel width coordinate of the storage start position is greater than a width maximum value;

under the condition that the channel width coordinate of the storage start position is greater than the width maximum value, detecting that all the channel directions corresponding to the storage start position are fully occupied for storage, and in response to detecting that all the channel directions corresponding to the storage start position are fully occupied for storage, adding 1 to the channel height coordinate of the storage start position, setting the channel width coordinate of the storage start position to be 0 to obtain a new storage start position, and from the new storage start position, sequentially storing remaining pieces of image data to the dynamic random memory along the channel direction; and under the condition that the channel width coordinate of the storage start position is not greater than the width maximum value, detecting that all the channel directions corresponding to the storage start position are fully occupied for storage, and in response to detecting that all the channel directions corresponding to the storage start position are fully occupied for storage, adding 1 to the channel width coordinate of the storage start position to obtain a new storage start position, and from the new storage start position, sequentially storing remaining pieces of image data to the dynamic random memory along the channel direction;

after sequentially storing the image data in the dynamic random memory according to the preset storage format, further comprising:

under the condition that the data read instruction is received, determining target data according to a data read instruction, wherein the target data is multi-channel parallel image data; and transferring the target data to a first-input first-output memory of a field programmable gate array.

11. The non-transitory computer-readable storage medium according to claim 10, wherein reading a preset number of multi-channel parallel image data from the dynamic random memory comprises:

determining a memory read address in a present round, and reading the preset number of multi-channel parallel image data according to the memory read address in the present round; and reading a preset number of multi-channel parallel image data from the dynamic random memory further comprises:

calculating a memory read address in a next round according to the memory read address in the present round; and after the first-input first-output memory of the field programmable gate array is ready, according to the memory read address in the next round, reading a preset number of multi-channel parallel new image data, and storing the multi-channel parallel new image data to the first-input first-output memory of the field programmable gate array.

* * * * *